United States Patent
Eyre et al.

(10) Patent No.: US 9,482,056 B2
(45) Date of Patent: Nov. 1, 2016

(54) SOLID PCD CUTTER

(71) Applicant: Smith International, Inc., Houston, TX (US)

(72) Inventors: Ronald K. Eyre, Orem, UT (US); John Daniel Belnap, Lindon, UT (US); Youhe Zhang, Spring, TX (US); Yuelin Shen, Spring, TX (US); Jibin Shi, Spring, TX (US); Yuri Burhan, Spring, TX (US)

(73) Assignee: Smith International, Inc., Houston, TX (US)

( * ) Notice: Subject to any disclaimer, the term of this patent is extended or adjusted under 35 U.S.C. 154(b) by 393 days.

(21) Appl. No.: 13/719,326

(22) Filed: Dec. 19, 2012

(65) Prior Publication Data

US 2013/0168159 A1 Jul. 4, 2013

Related U.S. Application Data

(60) Provisional application No. 61/581,707, filed on Dec. 30, 2011.

(51) Int. Cl.

| | |
|---|---|
| *E21B 10/46* | (2006.01) |
| *E21B 10/56* | (2006.01) |
| *B22F 3/14* | (2006.01) |
| *B22F 5/00* | (2006.01) |
| *B22F 7/00* | (2006.01) |
| *C22C 26/00* | (2006.01) |
| *C04B 35/52* | (2006.01) |
| *E21B 10/567* | (2006.01) |

(52) U.S. Cl.
CPC .................. *E21B 10/46* (2013.01); *B22F 3/14* (2013.01); *B22F 5/00* (2013.01); *B22F 7/008* (2013.01); *C04B 35/52* (2013.01); *C22C 26/00* (2013.01); *E21B 10/567* (2013.01); *B22F 2005/001* (2013.01)

(58) Field of Classification Search
CPC .... E21B 10/46; E21B 10/567; E21B 10/576; E21B 10/5735
See application file for complete search history.

(56) References Cited

U.S. PATENT DOCUMENTS

| | | | |
|---|---|---|---|
| 2,941,241 A | 6/1960 | Strong | |
| 2,941,248 A | 6/1960 | Hall | |
| 2,947,611 A | 8/1960 | Bundy | |
| 3,609,818 A | 10/1971 | Wentorf | |
| 3,767,371 A | 10/1973 | Rocco et al. | |
| 4,104,344 A * | 8/1978 | Pope et al. ..................... | 264/42 |

(Continued)

FOREIGN PATENT DOCUMENTS

| | | |
|---|---|---|
| EP | 0487355 B1 | 3/1995 |
| EP | 1006257 B1 | 2/2004 |

(Continued)

OTHER PUBLICATIONS

International Search Report and Written Opinion of PCT Application No. PCT/US2012/071109 dated Apr. 16, 2013.

*Primary Examiner* — Jennifer H Gay

(57) ABSTRACT

A cutting element may be formed by placing a plurality of diamond particles adjacent to a substrate in a reaction cell and subjecting the plurality of diamond particles to high pressure high temperature conditions to form a polycrystalline diamond body. The polycrystalline diamond body may have a cutting face area to thickness ratio ranging from 60:16 to 500:5 and at least one dimension greater than 8 mm.

18 Claims, 11 Drawing Sheets

(56) References Cited

U.S. PATENT DOCUMENTS

| | | | |
|---|---|---|---|
| 4,224,380 A | 9/1980 | Bovenkerk et al. | |
| 4,289,503 A | 9/1981 | Corrigan | |
| 4,673,414 A | 6/1987 | Lavens et al. | |
| 4,954,139 A | 9/1990 | Cerutti | |
| 5,127,923 A * | 7/1992 | Bunting et al. | 51/293 |
| 5,645,617 A | 7/1997 | Frushour | |
| 5,924,501 A | 7/1999 | Tibbitts | |
| 6,082,223 A | 7/2000 | Tibbitts | |
| 6,220,375 B1 * | 4/2001 | Butcher et al. | 175/428 |
| 6,846,341 B2 | 1/2005 | Middlemiss | |
| 7,377,341 B2 | 5/2008 | Middlemiss et al. | |
| 7,533,740 B2 | 5/2009 | Zhang et al. | |
| 7,703,559 B2 | 4/2010 | Shen et al. | |
| 7,757,793 B2 | 7/2010 | Voronin et al. | |
| 2004/0007394 A1 * | 1/2004 | Griffin | 175/434 |
| 2004/0140132 A1 | 7/2004 | Middlemiss | |
| 2005/0247491 A1 * | 11/2005 | Mirchandani et al. | 175/374 |
| 2006/0032677 A1 | 2/2006 | Azar et al. | |
| 2006/0060390 A1 * | 3/2006 | Eyre | 175/432 |
| 2006/0060392 A1 * | 3/2006 | Eyre | 175/434 |
| 2007/0079991 A1 * | 4/2007 | Cooley et al. | 175/57 |
| 2007/0187155 A1 * | 8/2007 | Middlemiss | 175/428 |
| 2007/0278017 A1 | 12/2007 | Shen et al. | |
| 2008/0017419 A1 * | 1/2008 | Cooley et al. | 175/286 |
| 2008/0185189 A1 | 8/2008 | Griffo et al. | |
| 2008/0223623 A1 | 9/2008 | Keshavan et al. | |
| 2008/0230280 A1 | 9/2008 | Keshavan et al. | |
| 2009/0173547 A1 | 7/2009 | Voronin et al. | |
| 2009/0313908 A1 * | 12/2009 | Zhang et al. | 51/309 |
| 2010/0012389 A1 | 1/2010 | Zhang et al. | |
| 2010/0012390 A1 * | 1/2010 | Shamburger | 175/434 |
| 2010/0196717 A1 | 8/2010 | Liversage et al. | |
| 2010/0219001 A1 | 9/2010 | Shen et al. | |
| 2010/0236836 A1 | 9/2010 | Voronin | |
| 2010/0243335 A1 * | 9/2010 | Dourfaye et al. | 175/433 |
| 2010/0326741 A1 | 12/2010 | Patel | |
| 2011/0017519 A1 | 1/2011 | Bertagnolli et al. | |
| 2011/0030283 A1 | 2/2011 | Cariveau et al. | |
| 2011/0036643 A1 | 2/2011 | Belnap et al. | |
| 2011/0253459 A1 * | 10/2011 | Davies et al. | 175/428 |
| 2011/0284293 A1 | 11/2011 | Shen et al. | |
| 2011/0297454 A1 | 12/2011 | Shen et al. | |
| 2012/0103699 A1 * | 5/2012 | Yu et al. | 175/428 |
| 2012/0241224 A1 | 9/2012 | Qian et al. | |
| 2012/0273280 A1 | 11/2012 | Zhang et al. | |
| 2012/0273281 A1 | 11/2012 | Burhan et al. | |
| 2013/0000993 A1 | 1/2013 | Shabalala et al. | |
| 2013/0133957 A1 | 5/2013 | Belnap et al. | |
| 2013/0140094 A1 | 6/2013 | Burhan et al. | |
| 2013/0146367 A1 | 6/2013 | Zhang et al. | |
| 2013/0168159 A1 * | 7/2013 | Eyre et al. | 175/432 |
| 2014/0131117 A1 * | 5/2014 | Bao et al. | 175/428 |
| 2014/0326515 A1 | 11/2014 | Shi et al. | |
| 2014/0326516 A1 | 11/2014 | Haugvaldstad et al. | |

FOREIGN PATENT DOCUMENTS

| | | |
|---|---|---|
| WO | 2008076908 A2 | 6/2008 |
| WO | 2010129813 A2 | 11/2010 |
| WO | 2010140108 A1 | 12/2010 |

\* cited by examiner

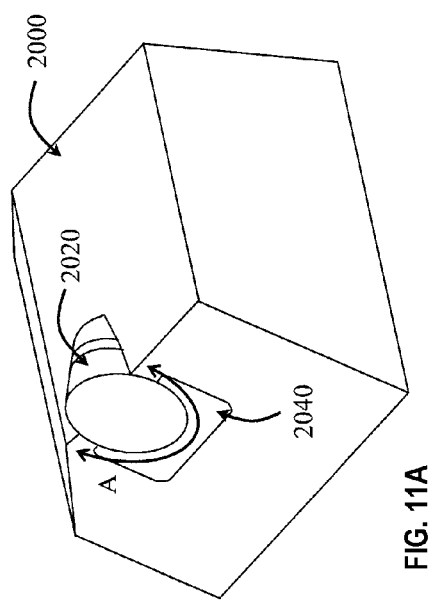
FIG. 11A
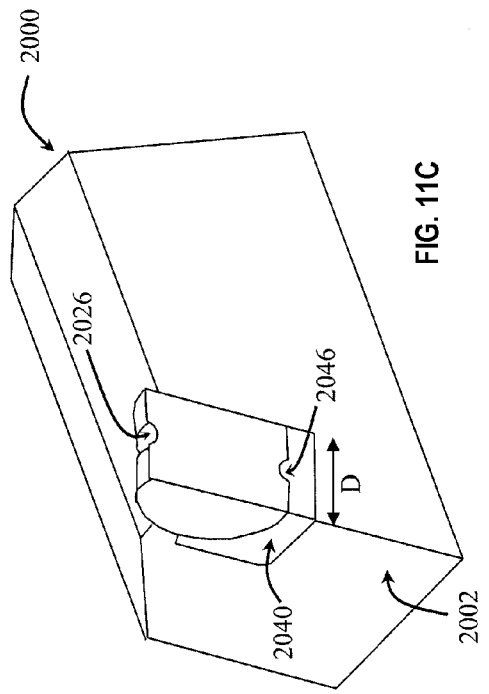
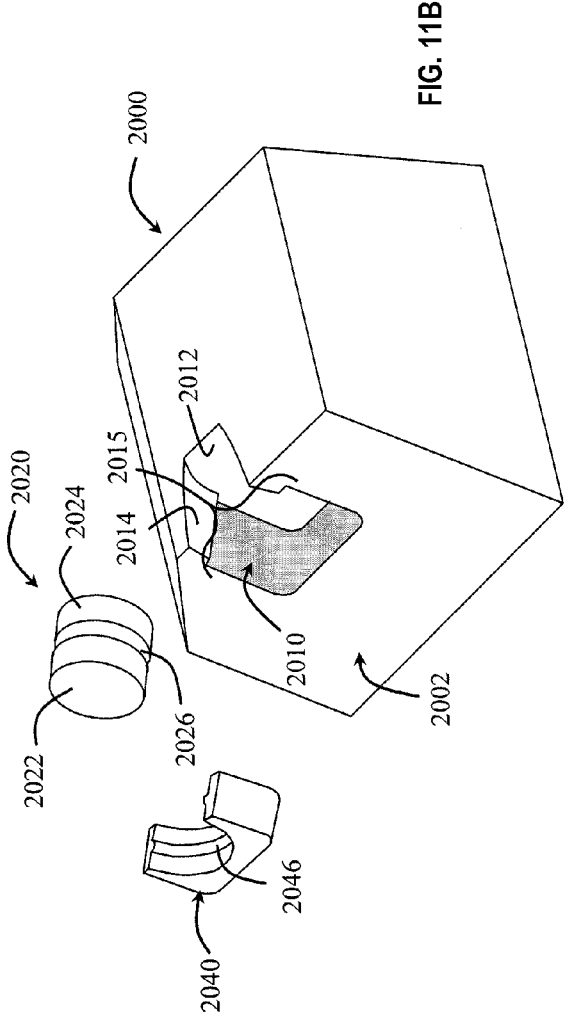
FIG. 11B
FIG. 11C

SOLID PCD CUTTER

RELATED APPLICATIONS

This application claims the benefit of U.S. Provisional Application Ser. No. 61/581,707, filed on Dec. 30, 2011, which is incorporated by reference herein in its entirety.

BACKGROUND

1. Technical Field

Embodiments disclosed herein relate generally to polycrystalline diamond cutters. In particular, embodiments disclosed herein related to bulk polycrystalline diamond bodies for use in downhole drilling applications.

2. Background Art

Drill bits used to drill wellbores through earth formations generally are made within one of two broad categories of bit structures. Depending on the application/formation to be drilled, the appropriate type of drill bit may be selected based on the cutting action type for the bit and its appropriateness for use in the particular formation. Drill bits in the first category are generally known as "roller cone" bits, which include a bit body having one or more roller cones rotatably mounted to the bit body. The bit body is typically formed from steel or another high strength material. The roller cones are also typically formed from steel or other high strength material and include a plurality of cutting elements disposed at selected positions about the cones. The cutting elements may be formed from the same base material as is the cone. These bits are typically referred to as "milled tooth" bits. Other roller cone bits include "insert" cutting elements that are press (interference) fit into holes formed and/or machined into the roller cones. The inserts may be formed from, for example, tungsten carbide, natural or synthetic diamond, boron nitride, or any one or combination of hard or superhard materials.

Drill bits of the second category are typically referred to as "fixed cutter" or "drag" bits. Drag bits, include bits that have cutting elements attached to the bit body, which may be a steel bit body or a matrix bit body formed from a matrix material such as tungsten carbide surrounded by a binder material. Drag bits may generally be defined as bits that have no moving parts. However, there are different types and methods of forming drag bits that are known in the art. For example, drag bits having abrasive material, such as diamond, impregnated into the surface of the material which forms the bit body are commonly referred to as "impreg" bits. Drag bits having cutting elements made of an ultra hard cutting surface layer or "table" (typically made of polycrystalline diamond material or polycrystalline boron nitride material) deposited onto or otherwise bonded to a substrate are known in the art as polycrystalline diamond compact ("PDC") bits.

PDC cutters have been used in industrial applications including rock drilling and metal machining for many years. In PDC bits, PDC cutters are received within cutter pockets, which are formed within blades extending from a bit body, and are typically bonded to the blades by brazing to the inner surfaces of the cutter pockets. The PDC cutters are positioned along the leading edges of the bit body blades so that as the bit body is rotated, the PDC cutters engage and drill the earth formation. In use, high forces may be exerted on the PDC cutters, particularly in the forward-to-rear direction. Additionally, the bit and the PDC cutters may be subjected to substantial abrasive forces. In some instances, impact, vibration, and erosive forces have caused drill bit failure due to loss of one or more cutters, or due to breakage of the blades.

In a typical PDC cutter, a compact of polycrystalline diamond ("PCD") (or other superhard material, such as polycrystalline cubic boron nitride) is bonded to a substrate material, which is typically a sintered metal-carbide to form a cutting structure. For example, a typical substrate material may include tungsten carbide interspersed with a binder component, preferably cobalt, which binds the tungsten carbide particles together. PCD comprises a polycrystalline mass of diamond grains or crystals that are bonded together to form an integral, tough, high-strength mass or lattice. The resulting PCD structure produces enhanced properties of wear resistance and hardness, making PCD materials extremely useful in aggressive wear and cutting applications where high levels of wear resistance and hardness are desired.

An example of a prior art PDC bit having a plurality of cutters with ultra hard working surfaces is shown in FIGS. 1 and 2. The drill bit 100 includes a bit body 110 having a threaded upper pin end 111 and a cutting end 115. The cutting end 115 typically includes a plurality of ribs or blades 120 arranged about the rotational axis L (also referred to as the longitudinal or central axis) of the drill bit and extending radially outward from the bit body 110. Cutting elements, or cutters, 150 are embedded in the blades 120 at predetermined angular orientations and radial locations relative to a working surface and with a desired back rake angle and side rake angle against a formation to be drilled.

A plurality of orifices 116 are positioned on the bit body 110 in the areas between the blades 120, which may be referred to as "gaps" or "fluid courses." The orifices 116 are commonly adapted to accept nozzles. The orifices 116 allow drilling fluid to be discharged through the bit in selected directions and at selected rates of flow between the blades 120 for lubricating and cooling the drill bit 100, the blades 120 and the cutters 150. The drilling fluid also cleans and removes the cuttings as the drill bit 100 rotates and penetrates the geological formation. Without proper flow characteristics, insufficient cooling of the cutters 150 may result in cutter failure during drilling operations. The fluid courses are positioned to provide additional flow channels for drilling fluid and to provide a passage for formation cuttings to travel past the drill bit 100 toward the surface of a wellbore (not shown).

Referring to FIG. 2, a top view of a prior art PDC bit is shown. The cutting face 118 of the bit shown includes a plurality of blades 120, wherein each blade has a leading side 122 facing the direction of bit rotation, a trailing side 124 (opposite from the leading side), and a top side 126. Each blade includes a plurality of cutting elements or cutters generally disposed radially from the center of cutting face 118 to generally form rows. Certain cutters, although at differing axial positions, may occupy radial positions that are in similar radial position to other cutters on other blades.

During manufacture of the cutting elements, the materials are typically subjected to sintering under high pressures and high temperatures. These manufacturing conditions result in dissimilar materials being bonded to each other. Because of the different thermal expansion rates between the diamond layer and the substrate material, thermal residual stresses are induced on the diamond and substrate layers, and at the interface there between after cooling. The residual stress induced on the diamond layer and substrate can often result in insert breakage, fracture or delamination under drilling conditions.

Further, a significant factor in determining the longevity of PDC cutters is the exposure of the cutter to heat. Conventional polycrystalline diamond is stable at temperatures of up to 700-750° C. in air, above which observed increases in temperature may result in permanent damage to and structural failure of polycrystalline diamond. Exposure to heat (through brazing the cutters to a cutting tool or through frictional heat generated from the contact of the cutter with the formation) can cause thermal damage to the diamond table and eventually result in the formation of cracks (due to differences in thermal expansion coefficients) which can lead to spalling of the polycrystalline diamond layer, delamination between the polycrystalline diamond and substrate, and conversion of the diamond back into graphite causing rapid abrasive wear. As a cutting element contacts the formation, a wear flat develops and frictional heat is induced. As the cutting element is continued to be used, the wear flat will increase in size and further induce frictional heat. The heat may build-up that may cause failure of the cutting element due to thermal mis-match between diamond and catalyst material used to form the PCD. This is particularly true for cutters that are immovably attached to the drill bit, as conventional in the art.

To minimize these deleterious effects, various prior art techniques have included keeping the thickness of the polycrystalline diamond layer to a minimum; use of transition layers (such as polycrystalline cubic boron nitride, or a mixture of substrate material and diamond); use of non-planar interfaces, etc.

However, there exists a continuing need for improvements in the material properties of composite materials used for drilling or cutting tool applications.

SUMMARY OF INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of forming a cutting element that includes placing a plurality of diamond particles adjacent to a substrate in a reaction cell; and subjecting the plurality of diamond particles to high pressure high temperature conditions to form a polycrystalline diamond body; wherein the polycrystalline diamond body comprises a cutting face area to thickness ratio ranging from 60:16 to 500:5; and wherein the polycrystalline diamond body has at least one dimension greater than 8 mm.

In another aspect, embodiments disclosed herein relate to a cutting element that includes a polycrystalline diamond body, wherein the polycrystalline diamond body has a cutting face; a thickness extending from the cutting face; and a cutting face area to thickness ratio ranging from 60:16 to 500:5; wherein at least one dimension is greater than or equal to 8 mm.

In another aspect, embodiments disclosed herein relate to a drill bit that includes a bit body having a rotational axis extending there through; at least one cutter pocket formed in the drill bit; and at least one cutting element positioned in the at least one cutter pocket, wherein the at least one cutting element comprises a polycrystalline diamond body, and wherein the polycrystalline diamond body includes a cutting face; a thickness extending from the cutting face to a distance within the cutter pocket; and a cutting face area to thickness ratio ranging from 60:16 to 500:5; wherein at least one dimension is greater than or equal to 8 mm; and wherein the at least one cutting element is positioned in the at least one cutter pocket such that the cutting face faces in the direction of rotation of the drill bit.

In yet another aspect, embodiments disclosed herein relate to a method of forming a cutting element that includes placing a plurality of first diamond particles and a catalyst material source in a reaction cell; and subjecting the plurality of diamond particles to high pressure high temperature conditions to form a first polycrystalline diamond body; and performing a second sintering process comprising: assembling a second volume comprising diamond particles adjacent to the first polycrystalline diamond body; and subjecting the second volume and the first polycrystalline diamond body to high pressure high temperature conditions to form a second polycrystalline diamond body.

In yet another aspect, embodiments disclosed herein relate to a drill bit that includes a bit body having a rotational axis extending there through; at least one cutter pocket formed in the drill bit; and at least one cutting element positioned in the at least one cutter pocket, wherein the at least one cutting element comprises a polycrystalline diamond body and has a bulk thermal conductivity of greater than 100 W/mK; wherein the at least one cutting element is positioned in the at least one cutter pocket such that the cutting face faces in the direction of rotation of the drill bit.

In yet another aspect, embodiments disclosed herein relate to a method of forming a cutting element that includes placing a plurality of diamond particles adjacent to a substrate in a reaction cell; and subjecting the plurality of diamond particles to high pressure high temperature conditions of 1300° C.-1700° C. and 55 to 90 kbar to form a polycrystalline diamond body; wherein the substrate comprises a first region adjacent to the diamond particles and at least one additional region adjacent to the first region opposite from the diamond particles, wherein the first region comprises hard particles having a smaller median grain size than hard particles of the at least one additional region.

Other aspects and advantages of the invention will be apparent from the following description and the appended claims.

BRIEF DESCRIPTION OF DRAWINGS

Embodiments of Rotating Cutting Elements for PDC Bits are described with reference to the following figures. The same numbers are used throughout the figures to reference like features and components.

FIGS. 11A-11C illustrate a rotatable polycrystalline diamond body, according to an embodiment of the invention.

DETAILED DESCRIPTION

Figure 1:
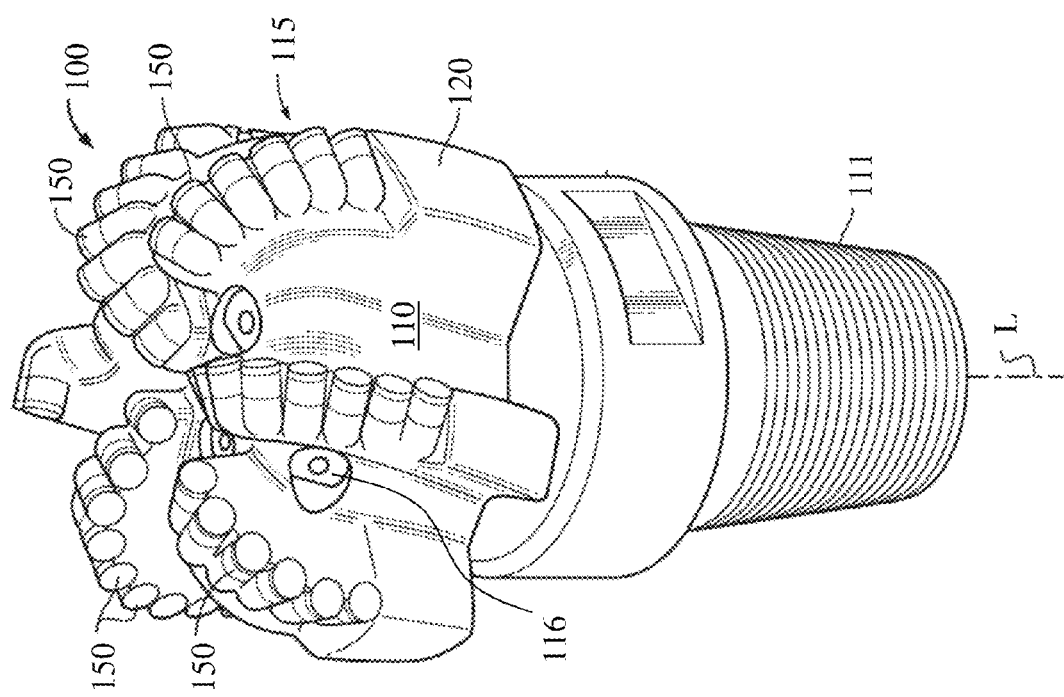
FIG. 1 shows a side view of a conventional drag bit.
Figure 2:
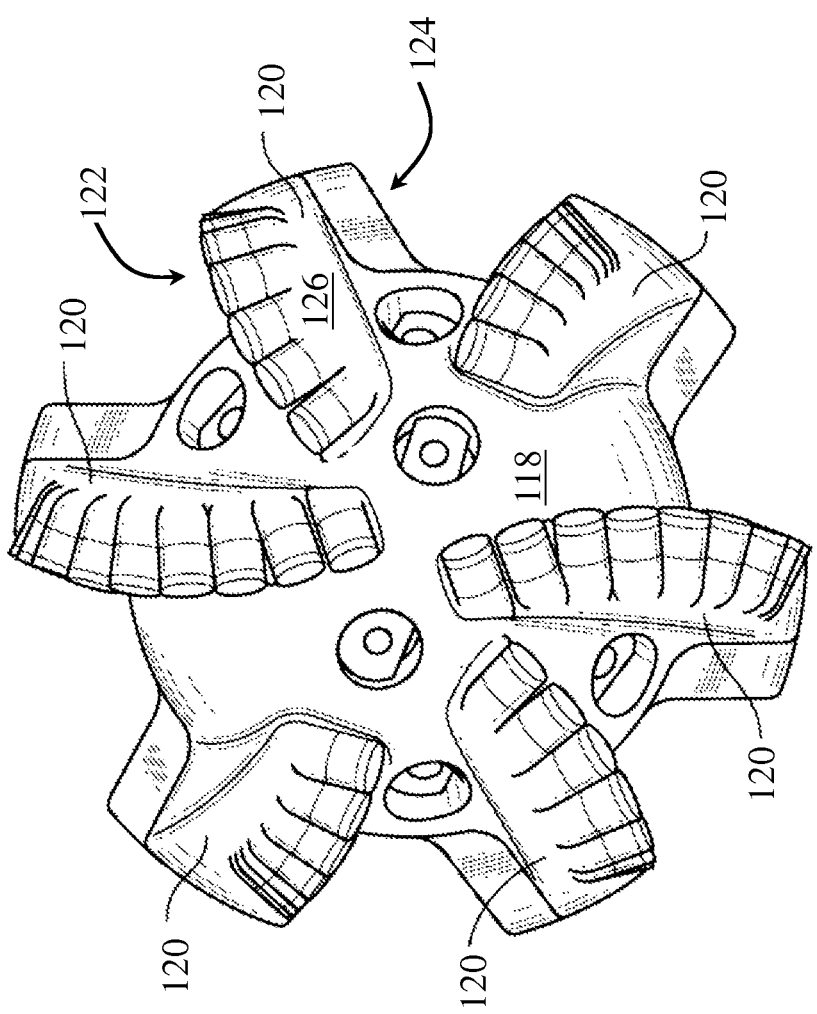
FIG. 2 shows a top view of a conventional drag bit.

Generally, embodiments disclosed herein relate to polycrystalline diamond ("PCD") cutting elements. PCD cutting elements of the present disclosure may include a PCD body (also referred to as a bulk PCD body) attached to a substrate, wherein the PCD body is thicker than diamond layers of conventional PCD cutting elements, or alternatively, PCD cutting elements of the present disclosure may be formed entirely of the PCD body.

As used herein, "polycrystalline diamond" or "PCD" refers to a plurality of interconnected diamond crystals having interstitial spaces there between in which a metal component (such as a metal catalyst) may reside. The interconnected diamond crystal structure of PCD includes direct diamond-to-diamond bonding and not diamond to diamond bonding through an intermediary material such as silicon carbide. The interconnected diamond crystal structure of PCD may often be referred to as forming a lattice or matrix structure. Particularly, a metal catalyst material, such as cobalt, may be used to promote re-crystallization of the diamond crystals, wherein the diamond grains are regrow together to form the lattice structure, thus leaving particles of the remaining metal catalyst within the interstitial spaces of the diamond lattice. Additionally, according to some embodiments of the present disclosure, PCD material may also include boron dopants, as discussed further below.

PCD, as defined by the present disclosure, may be formed by high pressure high temperature ("HPHT") sintering of diamond grains in the presence of a suitable catalyst or binder material, such as one or more elements from Group VIII of the Periodic table or a carbonate solvent catalyst, to achieve intercrystalline bonding between the diamond grains. Optionally, PCD of the present disclosure may be formed using boron-doped diamond crystals, or undoped diamond crystals and a boron additive, in the HPHT sintering process, as discussed further below. HPHT sintering typically includes placing an unsintered mass or volume of diamond grains within a reaction cell of a HPHT apparatus. A metal solvent catalyst material may be included with the unsintered mass of diamond crystalline particles in the reaction cell to promote intercrystalline diamond-to-diamond bonding. The catalyst material may be provided in the form of powder and mixed with the diamond grains, or may be infiltrated into the diamond grains during HPHT sintering. A suitable HPHT apparatus for this process is described in U.S. Pat. Nos. 2,947,611; 2,941,241; 2,941,248; 3,609,818; 3,767,371; 4,289,503; 4,673,414; and 4,954,139, each of which are incorporated herein by reference. The contents of the reaction cell (the mass of diamond grains and metal catalyst) may be subjected to HPHT conditions, which may conventionally include a minimum temperature of about 1200° C. and a minimum pressure of about 35 kbars, and typically temperatures between about 1300-1500° C. and pressures between about 45-60 kbar. However, due to the increased thickness of PCD bodies according to embodiments of the present disclosure, higher temperatures and pressures may be used when compared to the HPHT conditions of conventionally sized PCD bodies. For example, pressures may range from about 55 to 90 kbar, and temperatures may range from about 1300° C. to 1700° C. In embodiments, the lower limit of the pressure may be any of 55, 60, 65, 70, 75, or 80 kbar, and the upper limit of the pressure may be any of 65, 70, 75, 80, 85, or 90 kbar, with any lower limit being combinable with any upper limit. In embodiments, the lower limit of the temperature may be any of 1300° C., 1350° C., 1400° C., 1450° C., 1500° C., or 1550° C., and the upper limit may be any of 1450° C., 1500° C., 1550° C., 1600° C., 1650° C., or 1700° C., with any lower limit being combinable with any upper limit. Alternatively, the PCD material may be formed from a carbonate solvent catalyst, such as magnesium carbonate, which is typically sintered under HP/HT conditions of 65-90 kbar and 1800-2500° C.

As used herein, "thermally stable polycrystalline diamond" or "TSP" refers to a plurality of interconnected diamond crystals having a thermal stability greater than that of conventional PCD. For example, TSP may be formed by removing substantially all metal from the interstitial spaces between interconnected diamond crystals of PCD. Alternatively, rather than actually removing the catalyst material from PCD, the selected region of the PCD can be rendered thermally stable by treating the catalyst material in a manner that reduces or eliminates the potential for the catalyst material to adversely impact the intercrystalline bonded diamond at elevated temperatures. For example, the catalyst material can be combined chemically with another material to cause it to no longer act as a catalyst material, or can be transformed into another material that again causes it to no longer act as a catalyst material. Accordingly, as used herein, the terms "removing substantially all" or "substantially free" as used in reference to the catalyst material is intended to cover the different methods in which the catalyst material can be treated to no longer adversely impact the intercrystalline diamond in the PCD body or compact with increasing temperature.

Diamond grains useful for forming PCD may include any type of diamond particle, including natural or synthetic diamond powders having a wide range of grain sizes. For example, such diamond powders may have an average grain size in the range from submicrometer in size to 100 micrometers, and from 1 to 80 micrometers in other embodiments. Further, one skilled in the art would appreciate that the diamond powder may include grains having a mono- or multi-modal distribution.

The diamond powder may be combined with a desired catalyst material, and optionally, a boron additive powder, such as described in U.S. Pat. No. 6,846,341, which is assigned to the present assignee and herein incorporated by reference in its entirety. The boron additives may be mixed throughout the diamond powder, wherein the additives are small enough to diffuse into the diamond lattice formed as the diamond grains are regrown into the diamond-to-diamond bonded PCD. In some embodiments, a boron additive in the amount of about 0.1 to 3.0 wt %, but greater or lesser amounts may be used in other embodiments. A diamond powder mixture used to form PCD material of the present disclosure may be placed in a reaction cell, which is subjected to processing conditions sufficient to cause the intercrystalline bonding between the diamond crystals. It should be noted that if too much additional non-diamond material is present in the powdered mass of crystalline particles, appreciable intercrystalline bonding is prevented during the sintering process. Such a sintered material where appreciable intercrystalline bonding of regrown diamond has not occurred is not within the definition of PCD. Following such formation of intercrystalline bonding, a PCD body may be formed that has, in one embodiment, at least about 70 percent by volume diamond, with the remaining balance of the interstitial regions between the diamond grains occupied by the catalyst material. In other embodiments, the PCD may comprise at least 85 percent by volume diamond, and in another embodiment at least 90 percent by volume diamond. However, one skilled in the art would appreciate that other diamond densities may be used in alternative embodiments. Thus, PCD in accordance with the present disclosure may include what is frequently referred to in the art as "high diamond density" PCD.

Figure 3:
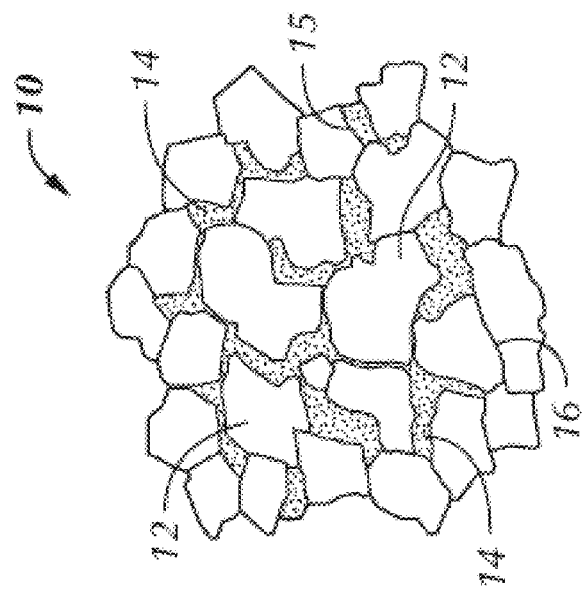
FIG. 3 is a schematic of a microstructure of a polycrystalline diamond material.

FIG. 3 illustrates an example of a PCD microstructure 10 according to the present disclosure, which comprises a plurality of diamond grains 12 that are bonded to one another with interstitial volumes occupied by a binder material 14. Such PCD materials may comprise a binder material or metal content up to about 20 percent by volume, up to 10 percent by volume, or up to 8 percent by volume in other embodiments, and the metals employed as the binder can include, for example, Co, Ni, Fe, and mixtures thereof. The particular amount of the metal component that is used is typically controlled to provide a compromise between properties such as thermal stability, toughness, and hardness.

Referring still to FIG. 3, it is evident that the binder material 14 is not continuous throughout the microstructure in the PCD material. Rather, the microstructure of the PCD material may have a uniform distribution of binder among the interconnected diamond grains, thus forming both diamond grain/binder interfaces 15 and diamond grain/diamond grain interfaces 16. The strength of a given diamond to diamond bond is limited by particle size, impurities in the sintered powders, and individual crystal to crystal misorientation.

In contrast to the PCD material of the present disclosure, as defined above, prior art diamond layers have been formed by chemical vapor deposition ("CVD"). In particular, CVD diamond may be produced by the reaction of a carbon based gas, such as methane, acetylene or carbon dioxide, with atomic hydrogen, in the presence of traces of oxygen. Various methods of activating atomic hydrogen may include, for example, resistive heating of a metal filament, an oxy-acetylene torch, or some form of plasma, such as an arc or a glow discharge plasma. Although CVD diamond includes the growth of multiple crystals (polycrystalline) of diamond, CVD diamond does not fall under the present disclosure's definition of PCD. Rather, CVD diamond has distinct material differences from the PCD material of the present disclosure, as defined above. For example, CVD diamond grows in a columnar structure, wherein continuous columnar grains grow from the CVD nucleation sites, with no appreciable bonds being formed between adjacent columnar diamond grains, whereas PCD diamond is formed from an agglomeration of intergrown diamond crystals. Further, CVD diamond is formed fully dense with no binder phase.

Further, other types of manufactured diamond that fall outside of the present disclosure's definition of PCD may include high pressure synthetic single-crystal diamonds, carbide-diamond composites, detonation diamond, diamond-like carbon ("DLC"), and diamond produced by methods other than the HPHT processing described above to form polycrystalline diamond. Diamond layers formed by methods other than the one described in the present disclosure's definition of PCD have distinct material properties, and thus may be distinguished from PCD of the present disclosure not only by the method of formation but also by microstructural characteristics. For example, because of the random orientation of its diamond grains, PCD of the present disclosure may be tougher than natural diamond, synthetic diamond coatings and CVD diamond. Additionally, while diamond grains are bonded directly to one another in PCD of the present disclosure, diamond grains of carbide-diamond composites (such as silicon carbide) are bonded together through the carbide material (i.e., diamond-carbide-diamond). Although some diamond-to-diamond bonding may also occur in carbide-diamond composites, such diamond-to-diamond bonding does not form the diamond lattice structure of PCD, as defined herein. Rather, carbide-diamond composites include a mass of diamond and carbide, bonded together by both diamond-carbide bonds and diamond-diamond bonds. However, the bonds between the diamond grains of the PCD material of the present disclosure consist of direct diamond-to-diamond bonds with no other bonds being present between another material and the diamond grains.

According to embodiments of the present disclosure, a method of forming a cutting element may include placing a plurality of diamond particles, a catalyst material source (such as a substrate or a catalyst material powder), and optionally a boron additive in a reaction cell of a HPHT apparatus and subjecting the plurality of diamond particles to HPHT conditions to form a PCD body. High pressure high temperature conditions may include temperatures greater than 1300° C., preferably ranging between 1300° C. and 1700° C., and pressures greater than 5 GPa, preferably ranging between 5.5 GPa and 9.0 GPa. Under the HPHT conditions, a substantial amount of direct diamond-to-diamond bonding occurs between the diamond particles to form the PCD body.

Figure 7:
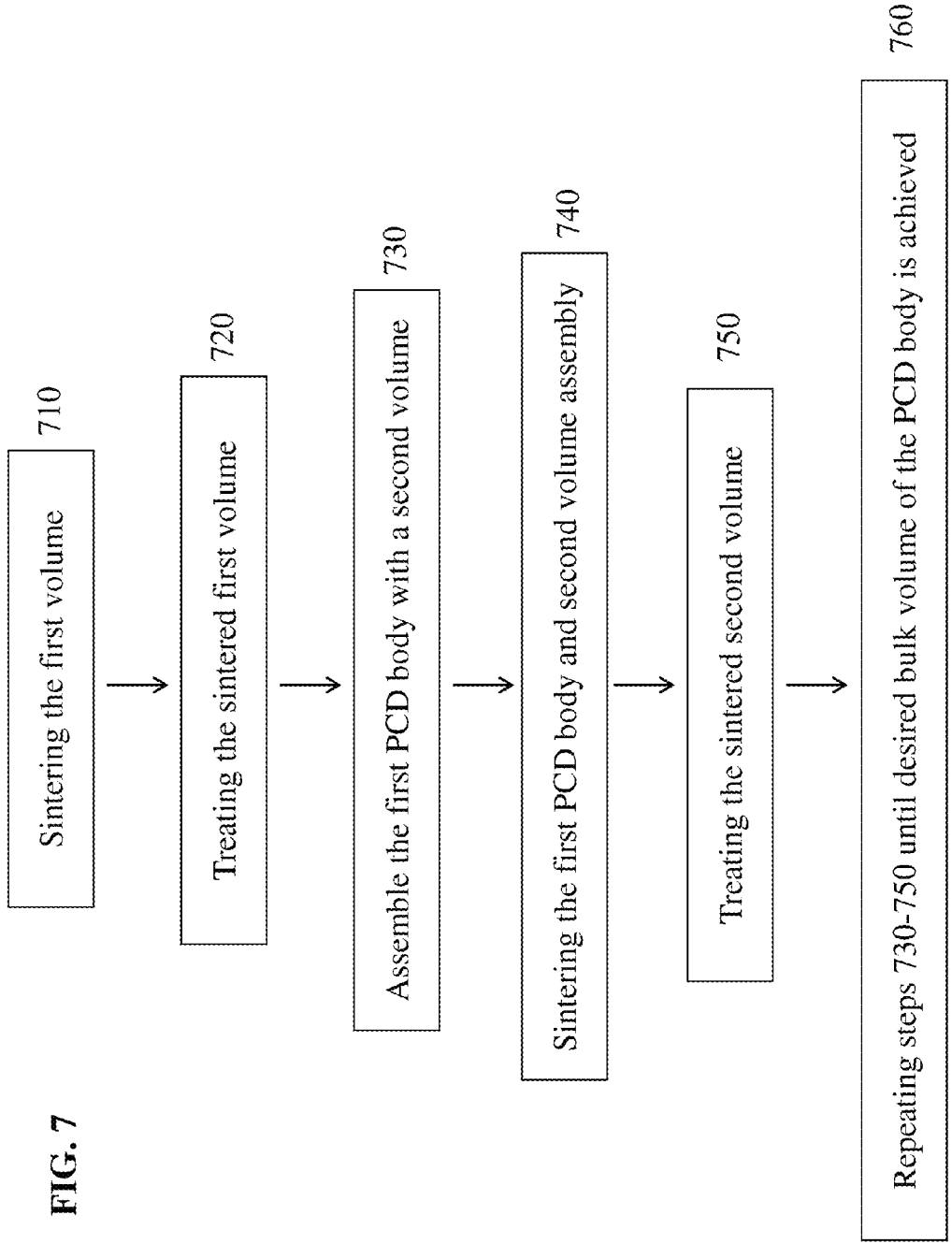
FIG. 7 shows a diagram of a method for forming polycrystalline diamond bodies according to embodiments of the present disclosure.
Figure 8:
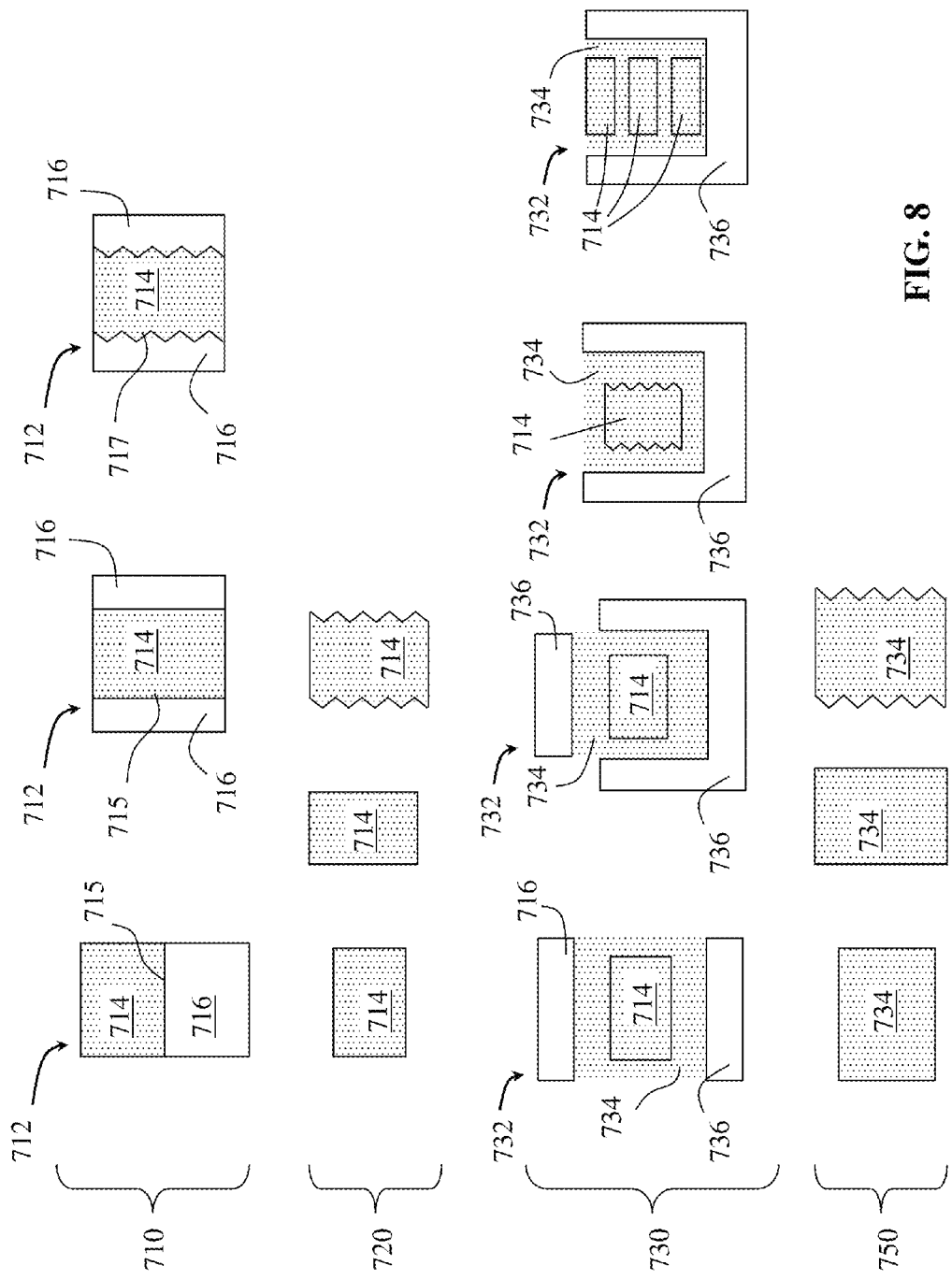
FIG. 8 shows steps for forming polycrystalline diamond bodies according to embodiments of the present disclosure.

In some embodiments, a method of forming a bulk PCD body may include using multiple HPHT sintering processes, such as shown in FIGS. 7 and 8. In particular, FIG. 7 shows a diagram of steps to form a bulk PCD body according to methods of the present disclosure, and FIG. 8 shows examples of the steps recited in FIG. 7. As shown, a first volume may be subjected to HPHT sintering conditions 710, wherein the first volume may include a plurality of diamond particles, a catalyst material source (such as a substrate or a catalyst material powder), and optionally a boron additive. Upon subjecting the first volume to HPHT sintering conditions, the plurality of diamond particles are bonded together to form PCD. Further, in embodiments having a substrate 716 as the catalyst material source, such as shown in FIG. 8, the sintered first volume 712 includes the PCD body 714 attached to the substrate 716. The sintered first volumes 712 shown in FIG. 8 have a PCD body 714 formed adjacent to a single substrate 716 at a planar interface 715, a PCD body 714 formed adjacent to two smaller substrates 716 at planar interfaces 715, and a PCD body 714 formed adjacent to two smaller substrates 716 at non-planar interfaces 717. However, according to other embodiments, the sintered first volume may include a PCD body formed adjacent to one or more substrate catalyst sources having various other shapes and sizes. Further, in yet other embodiments, the sintered first volume may include a PCD body formed without a substrate. For example, a first volume may include mixture of a plurality of diamond particles and a catalyst material powder, such as cobalt, which may be subjected to HPHT sintering conditions without a substrate to form a sintered first volume having a PCD body and no substrate. The sintered first volume may then optionally be treated 720, such as by any of removing a substrate from the PCD body 714, cleaning the PCD body 714, and/or leaching the PCD body 714.

The PCD body 714 may then be assembled 730 together with a second volume 732, wherein the second volume 732 may include a plurality of diamond particles 734, a catalyst material source such as a substrate 736, and optionally a boron additive. However, according to other embodiments, a second volume may include a catalyst material source in the form of a powder, either mixed with the diamond particles or placed adjacent to the diamond particles. The assembly may then be subjected to HPHT sintering conditions 740 to form a sintered second volume. Upon subjecting the assembly to HPHT sintering conditions, the plurality of diamond particles 734 in the second volume 732 are bonded together and to the PCD body 714 of the sintered first volume to form a larger PCD body 734. The second sintered volume may then be treated 750, such as by any of removing a substrate 736 from the PCD body 734, cleaning the PCD body 734, and/or leaching the PCD body 734. Additional volumes, such as a third volume, fourth volume, fifth volume, etc., of diamond particles, a catalyst source, and optionally a boron additive may be subsequently sintered with the PCD body 734 until a desired bulk volume of the PCD body is achieved. Thus, according to embodiments of the present disclosure, a bulk PCD body may be grown using multiple HPHT sintering processes, such as shown in FIG. 7, wherein the PCD body has a larger volume than conventionally formed PCD layers. Further, in particular embodiments, the pressure used in the first sintering cycle may be greater than the pressure used in the second sintering cycle, and with the pressure being incrementally descreased, with even further sintering cycles.

Figure 9:
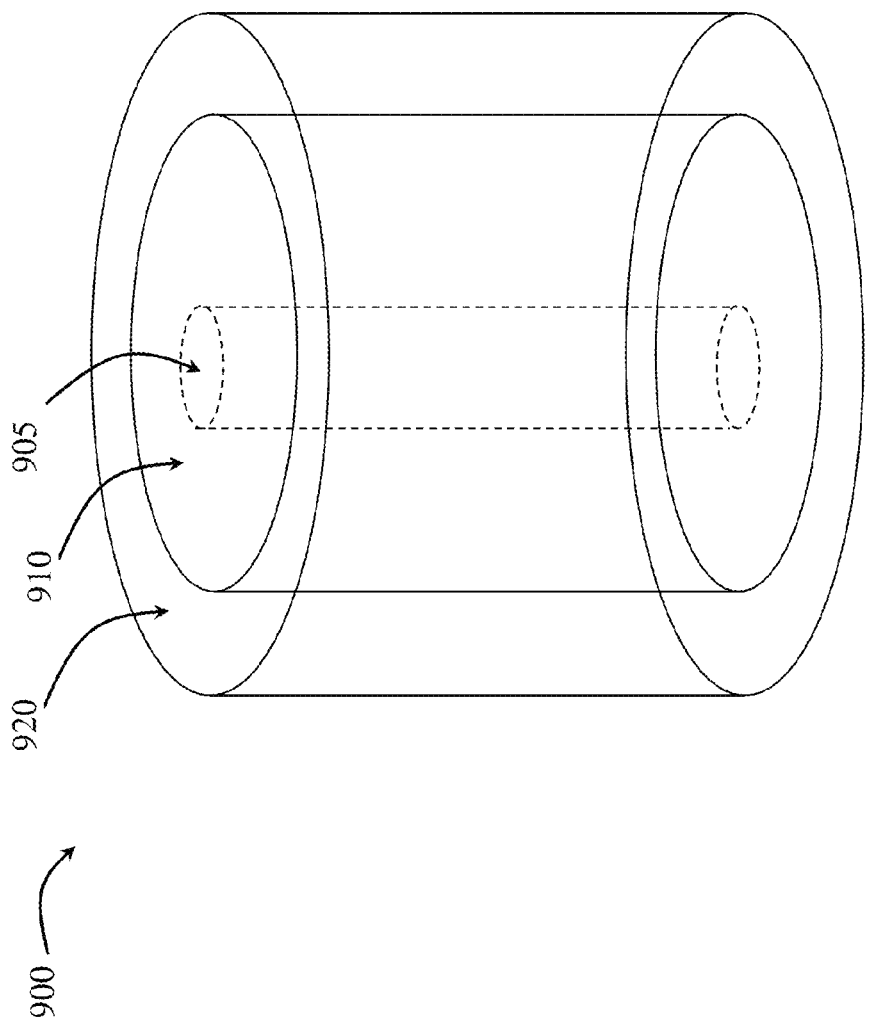
FIG. 9 shows a polycrystalline diamond body according to embodiments of the present disclosure.

Referring now to FIG. 9, a bulk PCD body 900 may be grown using multiple HPHT sintering processes, wherein a catalyst material source is provided as a core 905. In particular, a catalyst material source, such as tungsten carbide cobalt, may be provided as a core 905. A plurality of diamond particles (and optionally a boron additive) may be placed around the core 905 and subjected to HPHT sintering conditions, such as in a reaction cell of an HPHT apparatus, to form a first PCD layer 910 around the core 905. Another plurality of diamond particles may be placed around the first PCD layer 910 and subjected to HPHT sintering conditions to form a second PCD layer 920 around the first PCD layer 910. This may be repeated so that additional PCD layers may be formed around the second PCD layer until a desired bulk PCD body is achieved. According to various embodiments, the plurality of diamond particles forming various layers of the bulk PCD body may include additional catalyst source material, such as cobalt powder, and optionally boron additives. Further, although the core 905 is shown as having a rod-shape extending the entire length of the bulk PCD body in FIG. 9, a core may have other shapes and sizes and may extend the entire length or a partial length of the bulk PCD body. In some embodiments, the core 905 may form an acid infusion pathway (as described below) during optional subsequent leaching processes.

Figure 10:
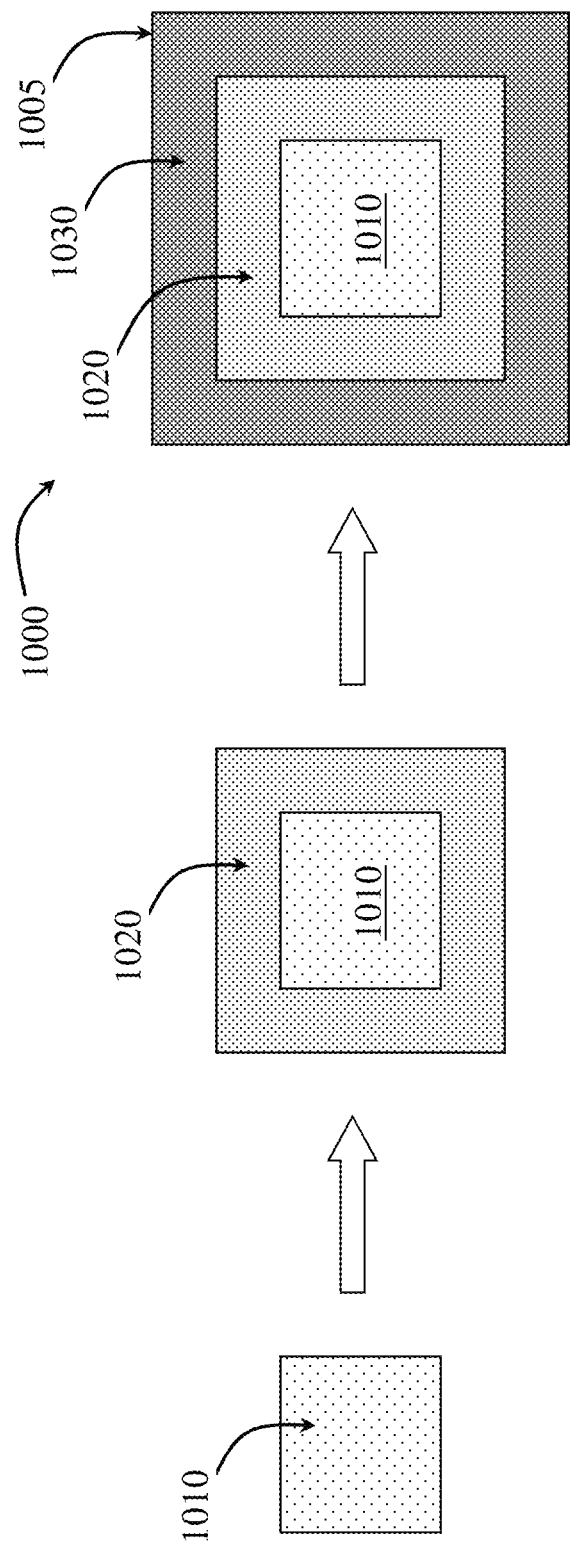
FIG. 10 shows a polycrystalline diamond body according to embodiments of the present disclosure.

According to some embodiments of growing a bulk PCD body using multiple HPHT sintering processes, the bulk PCD body may be formed to include gradient properties, such as decreasing particle size from an inner region of the bulk PCD body to an outer surface of the bulk PCD body. For example, as shown in FIG. 10, a plurality of diamond particles and a catalyst material may be subjected to HPHT sintering conditions to form a first PCD body 1010. The diamond particles may have a particle size ranging from 50 to 150 microns, with a lower limit of any of 50 microns, 75 microns, 100 microns, or 125 microns, and an upper limit of any of 75 microns, 100 microns, 125 microns, or 150 microns, where any lower limit may be combined with any upper limit. A plurality of diamond particles and a catalyst material may then be placed around the first PCD body 1010 and subjected to HPHT sintering conditions to form a second PCD body 1020 larger than the first PCD body 1010. The plurality of diamond particles placed around the first PCD body to form the second PCD body 1020 may be smaller than the diamond particles used to form the first PCD body 1010, and may range, for example from 30 microns to 100 microns, with any lower limit of 30 microns, 40 microns, 50 microns, 60 microns, 70 microns, or 80 microns, and any upper limit of 50 microns, 60 microns, 70 microns, 80 microns, 90 microns, or 100 microns, where any lower limit may be used in combination with any upper limit. A plurality of diamond particles and a catalyst material may then be placed around the second PCD body 1020 and subjected to HPHT sintering conditions to form a third PCD body 1030 larger than the second PCD body 1020. The plurality of diamond particles placed around the second PCD body to form the third PCD body 1030 may be smaller than the diamond particles used to form the second PCD body 1020, and may range, for example, from about 0.1 microns to 50 microns, with any lower limit of 0.1 microns, 0.5 microns, 1 micron, 3 microns, 5 microns, 7 microns, 10 microns, 15 microns, 20 microns, or 30 microns, and any upper limit of 10 microns, 20 microns, 30 microns, 40 microns, or 50 microns, where any lower limit may be used in combination with any upper limit. Additional processes of placing diamond particles having decreasing particle sizes around PCD bodies and subjecting the assembly to HPHT sintering conditions may be preformed until the desired volume of the bulk PCD body 1000 is achieved. Further, by using decreasing diamond particle sizes in each subsequent sintering process, the bulk PCD body 1000 may have a decreasing particle size gradient formed therein, wherein the largest diamond particles form an inner region of the bulk PCD body 1000, the smallest diamond particles form an outer surface 1005 of the bulk PCD body 1000, and decreasing diamond particle sizes are used there between. However, according to other embodiments of the present disclosure, other gradients may be formed through multiple sintering processes in a bulk PCD body. For example, an increasing particle size gradient may be formed from an inner region of the bulk PCD body to an outer surface of the bulk PCD body. In other examples, a diamond density gradient may be formed within the bulk PCD body. For example, a bulk PCD body may have a highest diamond density in an inner region of the bulk PCD body, a lowest diamond density at an outer surface of the bulk PCD body, and a decreasing diamond density from the inner region to the outer surface. Alternatively, a bulk PCD body may have a lowest diamond density in an inner region of the bulk PCD body, a highest diamond density at an outer surface of the bulk PCD body, and an increasing diamond density from the inner region to the outer surface. Such diamond grains may range, for example, from 0.1 to 100 microns, as discussed above, and the diamond densities may fall within the range of 80 volume percent to 98 volume percent. The incremental differences in diamond densities between two adjacent regions may be at least 2 percent or at least 5 percent, thus the particular densities and incremental differences may depend, for example, on the total number of regions being used, and the desired density for the outer, cutting edge, for example.

According to some embodiments of the present disclosure, PCD may be formed with boron dopants, such as by subjecting boron-doped diamond crystals and a catalyst material source to HPHT conditions, or by subjecting undoped diamond crystals, boron additive powder, and a catalyst material source to HPHT conditions. In embodiments formed by subjecting a mixture of diamond crystals, boron additive powder, and a catalyst material source to HPHT sintering, boron diffuses into and throughout the diamond lattice, causing the insulating diamond crystals to transform into semiconductive diamond crystals, as described in U.S. Pat. No. 6,846,341, which is incorporated herein by reference. Specifically, during the transformation of the insulating diamond material to a semiconductive material, some or all of the diamond crystals are converted to diamond crystals having a semiconductive surface due to diffusion of the boron. This diffusion phenomenon takes place during the HPHT sintering process used to solidify the PCD, during which the additive species are free to diffuse throughout the PCD. Thus, according to this method, undoped diamond crystals are converted to diamond crystals that include semiconductive surface layers. Advantageously, cutting elements of the present disclosure formed with boron-doped PCD may have enhanced thermal conductivity, which may improve the ability of the PCD to conduct heat away from the cutting surface of the cutting element.

PCD bodies of the present disclosure include a cutting face and a thickness extending from the cutting face. For example, referring to FIG. 4, a cutting element 400 includes a PCD body 410 disposed on a substrate 420, wherein an interface 405 is formed between the PDC body 410 and substrate 420. The PCD body 410 has a cutting face 415 and extends a thickness t from the cutting face 415 to the interface 405. As used herein, a cutting face of a PCD body refers to an outer surface of the PCD body that may contact an earthen formation to be cut. The cutting face of the PCD body may cut the earthen formation by a shearing action. Thus, cutting elements of the present disclosure may often be referred to as shear cutters. The shape and size of the cutting face may vary. For example, as shown, the cutting face 415 of the embodiment shown in FIG. 4 has a circular shape, wherein the diameter may range between 8 and 19 mm, or up to 22 mm. In such embodiments, the PCD body 410 may extend a thickness t from the circular-shaped cutting face 415 to form a cylindrical-shaped PCD body. However, according to other embodiments, a PCD body may have other shapes, such as an ellipsoid or a prism.

Further, a PCD body may have a cutting face area ranging, for example, from about 60 mm$^2$ to about 500 mm$^2$, with a lower limit of any of 60, 80, 100, 150, or 250 mm$^2$ and an upper limit of any of 150, 175, 260, 400, or 500 mm$^2$, where any lower limit may be combined with any upper limit. In some embodiments, a PCD body may have a non-planar cutting face. For example, a PCD body may have a curved cutting face, such as a concave or convex cutting face. In such embodiments, the cutting face area may be measured by including the surface area of the curve. Alternatively, a PCD cutting face may have multiple surface alterations, such as grooves or multiple convex/concave formations, formed in the cutting face. In such embodiments, the cutting face area may be measured by excluding the surface area of any surface alterations formed therein. Furthermore, a PCD cutting face may include part of a core (such as described in FIG. 9) that may be used to form an acid infusion pathway for leaching processes (described below). Such core material or acid infusion pathways are not considered when measuring the cutting face area.

Advantageously, the inventors of the present disclosure have found a way to form PCD bodies having a thickness greater than conventional PCD bodies formed in PCD cutting elements. The thickness of PCD bodies according to the present disclosure may be described using a cutting face area to thickness ratio. For example, PCD bodies according to the present disclosure may have a cutting face area to thickness ratio ranging from 60:16 to 500:5. According to some embodiments, the cutting face area to thickness ratio may have an upper limit selected from 500:5, 400:5, 350:9, 300:10, and 250:11, and a lower limit selected from 65:15, 70:14, and 75:13, wherein any lower limit may be used in combination with any upper limit. In other embodiments, a PCD body thickness may be described using the distance the thickness extends transversely or perpendicularly from the cutting face. For example, referring back to FIG. 4, the thickness t of the PCD body 410 may extend perpendicularly from the cutting face 415 a distance of at least 5 mm or at least 8 mm in another embodiment. According to some embodiments disclosed herein, a PCD body may extend a uniform thickness ranging between 5 mm and 12 mm, and up to 16 mm in other embodiments. According to other embodiments, a PCD body may have a non-uniform thickness that varies along the area of the cutting face, for example, in a PCD body having a non-planar cutting face and/or a non-planar interface, such that the thickness of the PCD body ranges between 8 mm and 16 mm.

Further, PCD cutting elements of the present disclosure formed by HPHT processing may or may not include a substrate attached thereto, and if included, it can optimally be removed after formation prior to installation on a cutting tool. For example, embodiments of the present disclosure may include placing a plurality of diamond particles (and optionally boron additives) adjacent to a suitable substrate material in a reaction cell and subjecting the contents of the reaction cell to HPHT conditions (such as described in FIGS. 7 and 8). The substrate material may comprise a catalyst or binder material that will melt and infiltrate into the diamond volume during HPHT processing. Further, the substrate may be provided in a powder, green, or sintered state, and may be selected from those substrates conventionally used to form PCD, that include carbides, nitrides, carbonitrides, ceramics, metallic materials, cermet materials, and combinations thereof. For example, substrate material may include hard particles, such as tungsten carbide particles, and a binder material, such as cobalt. Tungsten carbide particles used in a substrate composition may include, for example, cemented tungsten carbide, cast tungsten carbide, and/or other forms of tungsten carbide known in the art. A substrate composition may include hard particles having a median particle grain size ranging from about 2 microns to 6 microns according to some embodiments, from about 2 microns to 3 microns in other embodiments, and less than 2 microns in yet other embodiments. Further, a substrate composition may include a binder material comprising between about 12 and 16 percent by weight of the substrate composition.

Advantageously, the inventors of the present disclosure have found that the bulk thermal conductivity of a PCD cutting element may be increased by forming a PCD cutting element having no substrate or a smaller substrate mounted to a thicker PCD body when compared with conventional PCD cutting elements. For example, conventional cutting elements having a PCD cutting layer mounted to a substrate may have an estimated bulk thermal conductivity of 100 W/mK or less (where bulk thermal conductivity may be estimated from volumetrically weighted averages of the thermal conductivity properties of the PCD and substrate). However, PCD cutting elements of the present disclosure made of a solid PCD body (having no substrate mounted thereto) may have a bulk thermal conductivity of 200 W/mK or greater, and may range, for example, from 200 W/mK to 400 W/mK. PCD cutting elements of the present disclosure made of a substrate mounted to a PCD body having a thickness greater than conventionally formed PCD bodies may have a bulk thermal conductivity ranging from 100 W/mK to 200 W/mK in some embodiments. Additionally, as mentioned above, the inventors of the present disclosure have found that PCD bodies according to embodiments herein may be doped with boron to further increase the bulk thermal conductivity of the PCD cutting element. For example, PCD cutting elements of the present disclosure made with a boron-doped PCD body may have a bulk thermal conductivity of 400 W/mK or greater, and may range from 450 W/mK to 650 W/mK in some embodiments.

Conventional PCD cutting elements have been limited in their ability to conduct heat away from the cutting surface due to the relatively poor thermal conductivity of the substrate. However, the inventors of the present disclosure have advantageously found that the bulk thermal conductivity of a PCD cutting element may be increased by forming PCD cutting elements according to the present disclosure, which may be made of solid PCD bodies or relatively thicker PCD bodies mounted to smaller substrates when compared with conventional cutting elements. Specifically, replacing conventionally used substrates with additional PCD material allows for greater heat sinking capability of the cutting element due to the larger bulk thermal conductivity, thereby drawing more heat away from the cutting surface and reducing temperatures near the wear surfaces. Additionally, having no substrate (or a smaller and thus less critical substrate) mounted to PCD bodies of the present disclosure may allow for the use of boron dopants without concern for cutting element degradation. Specifically, while boron doping in conventional PCD cutting elements tend to embrittle the attached substrates, thus making them difficult to use in practice, the PCD cutting elements of the present disclosure are made with no substrate or a comparatively smaller substrate and thus less critical component of the cutting element. Thus, PCD cutting elements according to the present disclosure may be doped with boron to further enhance the cutting element's bulk thermal conductivity.

Figure 5:
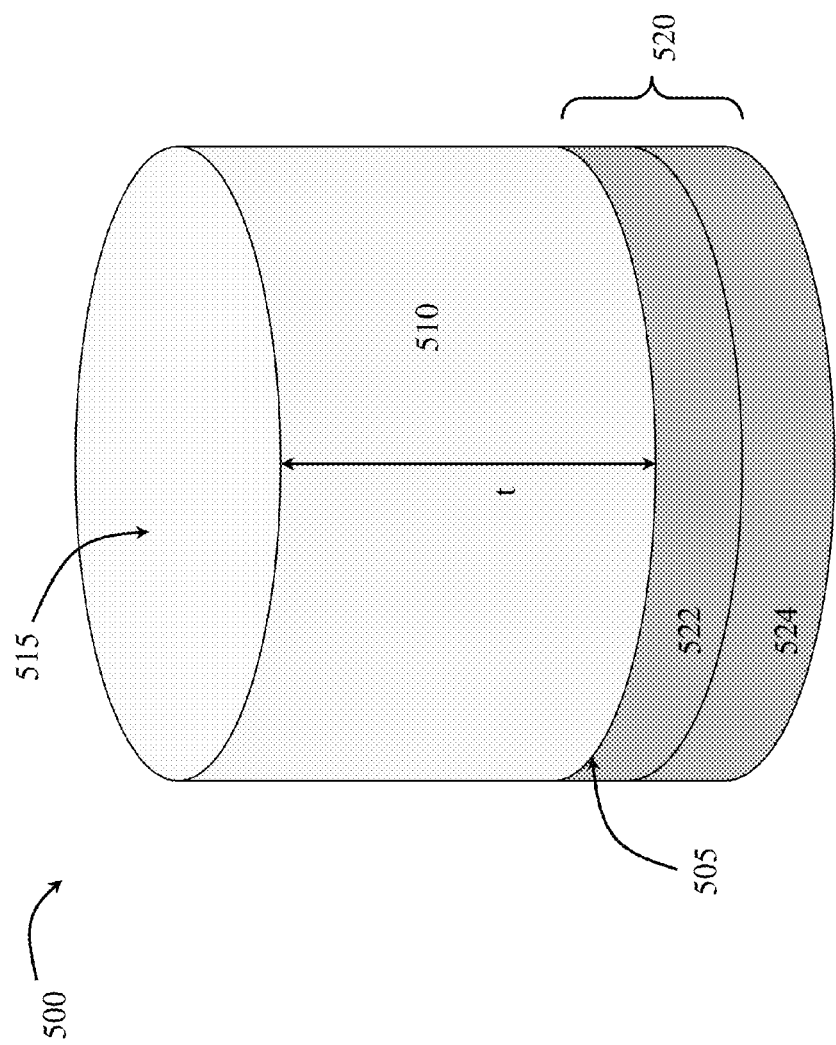
FIG. 5 shows a polycrystalline diamond cutting element according to embodiments of the present disclosure.

According to embodiments of the present disclosure, such as cutting element 500 shown in FIG. 5, a PCD body 510 may be formed on a substrate 520 at an interface 505, wherein the PCD body 510 has a cutting face 515 and a thickness t extending from the cutting face 515 to the interface 505. The substrate 520 may include two regions, a first region 522 adjacent to the PCD body 510 and a second region 524 adjacent to the first region 522 and opposite from the PCD body 510. The first region 522 may include a substrate composition having hard particles with a median grain size smaller than the median grain size of the hard particles forming the substrate composition of the second region 524. For example, the first region 522 may include a plurality of hard particles, such as tungsten carbide particles, disposed in a binder matrix, wherein the hard particles have a grain size ranging from about 2 microns to about 3 microns, and wherein the binder matrix material forms between 12 and 15 percent by weight of the first region composition. The second region 524 may include a plurality of hard particles disposed in a binder matrix, wherein the hard particles have a grain size ranging from about 4 microns to about 6 microns, and wherein the binder matrix material forms between 12 and 15 percent by weight of the first region composition. In some embodiments, the first region may form from about 10 vol % up to 100 vol % of the substrate, with the balance being the second region. In other embodiments, the first region may occupy a lower limit of any of 10, 25, 50, 70, or 90 volume percent and an upper limit of any of 10, 25, 50, 70, 90, or 100 volume percent, where any lower limit may be combined with any upper limit, and where the balance of the substrate is formed of the second region. In other embodiments, the second region may occupy a lower limit of any of 10, 25, 50, 70, or 90 volume percent and an upper limit of any of 10, 25, 50, 70, 90, or 100 volume percent, where any lower limit may be combined with any upper limit, and where the balance of the substrate is formed of the first region. Further, the first region 522 may be provided in a reaction cell of an HPHT apparatus (for forming a PCD body thereon) in powder or sintered form, and the second region 524 may be provided adjacent to the first region in powdered or sintered form.

In another embodiment, a PCD cutting element may be formed by placing a layer of hard particle powder, such as carbide powder, between a pre-formed substrate region and a plurality of diamond particles in a reaction cell of a HPHT apparatus, and subjecting the contents of the reaction cell to HPHT conditions. The pre-formed substrate region may include a hard particle phase, such as a tungsten carbide, disposed in a binder matrix, such as cobalt. The layer of carbide powder may include carbide particles having a smaller median grain size than the median grain size of the hard particle phase in the pre-formed substrate region. During the HPHT processing of the plurality of diamond particles, the carbide powder layer, and the pre-formed substrate region, the binder matrix material of the pre-formed substrate region may infiltrate through the carbide powder layer and into the plurality of diamond particles, thereby forming a PCD body interfacing a substrate having two regions, wherein the region adjacent to the PCD body (formerly the carbide powder layer) has a hard particle median grain size less than the hard particle median grain size of the region distant from the PCD body (formerly the pre-formed substrate region).

By using a smaller hard particle size in a substrate region adjacent to the PCD body than in an additional substrate region(s) distant from the PCD body, a hard particle size gradient may be formed throughout the substrate. According to embodiments of the present disclosure, two or more substrate regions may be used to form a substrate having a hard particle size gradient, wherein the region interfacing the PCD body has a hard particle median grain size smaller than the hard particle median grain size of the additional region(s) (opposite from the PCD body), and wherein subsequent regions have increasingly larger hard particle median grain sizes. Advantageously, the inventors of the present disclosure have found that a hard particle size gradient may help to slow the infiltration rate of the substrate binder material into the PCD body. A slower infiltration rate may prevent holes or eruptions from forming in the PCD body during HPHT processing. Other means of slowing the infiltration rate may include, for example, using substrates with lower magnetic saturation, such as described in U.S. Application No. 61/564,577, which is incorporated herein by reference.

Figure 4:
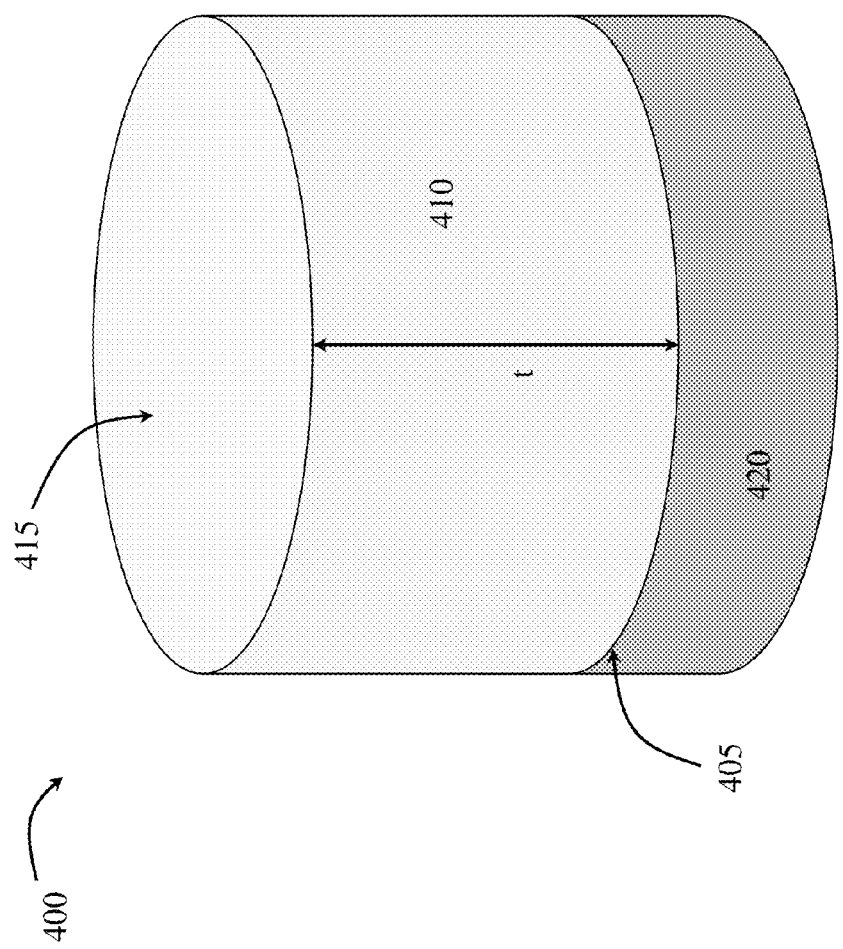
FIG. 4 shows a polycrystalline diamond cutting element according to embodiments of the present disclosure.

According to other embodiments, as shown in FIG. 4, a substrate 420 may be formed of a single continuous substrate composition. For example, the substrate 420 may include a hard particle phase, wherein the hard particles have a grain size of less than 6 microns, preferably ranging from about 2 microns to about 3 microns, and a binder phase, wherein the binder phase may form between 12 and 16 percent by weight of the substrate composition. According to other embodiments, hard particles having a grain size less than 2 microns or even less than 1 microns may be used to form the substrate. Such smaller particle sizes may be used in combination with higher sintering temperatures, such as temperatures ranging from 1500 to 1700° C. Hard particles having a grain size of 6 microns or less may be referred to herein as "fine grain hard particles." By using fine grain hard particles to form the substrate, a smaller mean free path between the hard particles may be achieved.

Advantageously, according to embodiments disclosed herein, PCD bodies having a thickness greater than conventionally made PCD bodies may be formed and used on downhole cutting tools. For example, the inventors of the present disclosure have found that by creating a smaller mean free path between the hard particles, the infiltration rate of the binder material into the adjacent PCD body during HPHT processing may be slower when compared with the infiltration rate occurring in substrate compositions having a larger mean free path between hard particles. Using a slower infiltration rate may prevent cracks from forming in the PCD body during processing and use, thus providing a thicker PCD body that may be used in downhole drilling operations or the like. Further, thick PCD bodies of the present disclosure may be formed using higher pressures than in HPHT processes used to form conventional PCD. Particularly, according to conventional methods of forming a PCD body on a substrate, the substrate material may contribute to pressure generation within a reaction cell of an HPHT apparatus. However, the thicker PCD bodies of the present disclosure formed with a relatively smaller substrate material (or no substrate material) may lack the pressure generation found in conventional PCD body formation. Thus, according to embodiments disclosed herein, a thick PCD body may be formed by an HPHT process having higher than conventional pressures, for example, by a 4-5% increase in pressure for forming a PCD body of the present disclosure on a relatively small substrate, or a 8-10% increase in pressure for forming a PCD body of the present disclosure without the use of a substrate.

In embodiments having a PCD body formed upon a substrate, the substrate may be subsequently removed from the PCD body to form a PCD cutting element made entirely of PCD. For example, a substrate may be removed from a PCD body by grinding or blasting off the substrate, by acid digestion, or by other removal methods known in the art.

Furthermore, PCD bodies of the present disclosure may be at least partially leached (i.e., leached at least a partial distance from a surface of the PCD body), whereby the catalyst material is removed from the leached part of the PCD body. As used herein, the term "removed" refers to the reduced presence of catalyst material in the PCD body, and is understood to mean that a substantial portion of the catalyst material no longer resides in the PCD body. However, one skilled in the art would appreciate that trace amounts of catalyst material may still remain in the microstructure of the PCD body within the interstitial regions and/or adhered to the surface of the diamond grains. Alternatively, rather than actually removing the catalyst material from the PCD body, the selected region of the PCD body can be rendered thermally stable by treating the catalyst material in a manner that reduces or eliminates the potential for the catalyst material to adversely impact the intercrystalline bonded diamond at elevated temperatures. For example, the catalyst material may be combined chemically with another material to cause it to no longer act as a catalyst material (or to have less thermal mismatch with diamond), or can be transformed into another material that again causes it to no longer act as a catalyst material (or to have less thermal mismatch with diamond). Accordingly, as used herein, the terms "removing substantially all" or "substantially free" as used in reference to the catalyst material is intended to cover the different methods in which the catalyst material can be treated to no longer adversely impact the intercrystalline diamond in the PCD body with increasing temperature.

The quantity of the catalyst material remaining in the material PCD microstructure after the PCD body has been subjected to a leaching treatment may vary, for example, on factors such as the treatment conditions, including treatment time. Further, one skilled in the art would appreciate that it may be acceptable or desired in certain applications to allow a small amount of catalyst material to stay in the PCD body. In a particular embodiment, the PCD body may include up to 1-2 percent by weight of the catalyst material. However, one skilled in the art would appreciate that the amount of residual catalyst present in the leached PCD body may depend on the diamond density of the material, and the body thickness.

A PCD body of the present disclosure may be leached by exposing the PCD body to a leaching agent, such as described in U.S. Pat. No. 4,224,380, which is herein incorporated by reference in its entirety. In select embodiments, the leaching agent may be a weak, strong, or mixtures of acids. In other embodiments, the leaching agent may be a caustic material such NaOH or KOH. Suitable acids may include, for example, nitric acid, hydrofluoric acid, hydrochloric acid, sulfuric acid, phosphoric acid, or perchloric acid, or combinations of these acids. In addition, caustics, such as sodium hydroxide and potassium hydroxide, have been used to the carbide industry to digest metallic elements from carbide composites. In addition, other acidic and basic leaching agents may be used as desired. Those having ordinary skill in the art will appreciate that the molarity of the leaching agent may be adjusted depending on the time desired to leach, concerns about hazards, etc.

Further, accelerated leaching techniques may be used to treat a PCD body of the present disclosure, such as described in U.S. Provisional Application No. 61/081,626, which is assigned to the present assignee and herein incorporated by reference in its entirety. For example, the leaching of a PCD body may be accelerated by forming acid infusion pathway(s) in the PCD body, so that the acid (or other leaching agent) may more readily access the interior portions of the PCD body, leading to a faster and cleaner leaching treatment. Acid infusion pathways may include any passage or structure through which a leaching agent (often acid) flows with less resistance than compared to an intercrystalline network of diamond grains so that such leaching agent may more readily infuse into interior regions of the polycrystalline diamond layer. Thus, such acid infusion pathways may include cavities formed from removal of PCD material from the PCD body, as well as a material structure through which a leaching agent may more easily diffuse as compared to PCD, such as for example, through incorporation of a metal, cermet, or ceramic fiber into a diamond mixture such that a metal-, cermet-, or ceramic-filled channel or passageway is formed in the PCD body. For example, according to some embodiments, a PCD body may have at least one acid infusion pathway that is a cavity or channel extending a distance through the PCD body up to the entire thickness of the PCD body and that has a diameter ranging from microns to 1 mm, and up to about 7 mm, depending on the diameter of the PCD body. Further, an acid infusion pathway extending through a PCD body may be formed before or during a leaching process. Methods of forming cavities in a PCD body are described in U.S. Provisional Application No. 61/081,619, which is assigned to the present assignee and herein incorporated by reference in its entirety. Moreover, other accelerating leaching techniques may be used, such as application of increased temperatures, pressures, ultrasound, etc., including the techniques described in U.S. Patent Application No. 2008/0185189, which is assigned to the present assignee and herein incorporated by reference in its entirety. Leaching a PCD body may be desirable for some rolling cutter embodiments, as well as fixed cutter embodiments.

According to embodiments of the present disclosure, at least part of a PCD may be leached to form thermally stable polycrystalline diamond. For example, a PCD body may be subjected to a leaching process along at least part of the thickness of the PCD body. According to some embodiments, at least 2 mm along the thickness of the PCD body may be leached. However, according to other embodiments, the entire PCD body may be leached. Advantageously, because embodiments of the present disclosure may include a cutting element made only of a PCD body with no substrate, the entire cutting element may be subjected to a leaching process (e.g., the entire cutting element may be placed in a leaching agent or in an accelerated leaching vessel), whereas conventional cutting elements having a PCD body mounted to a substrate requires the substrate to be masked from the leaching process.

Figure 6:
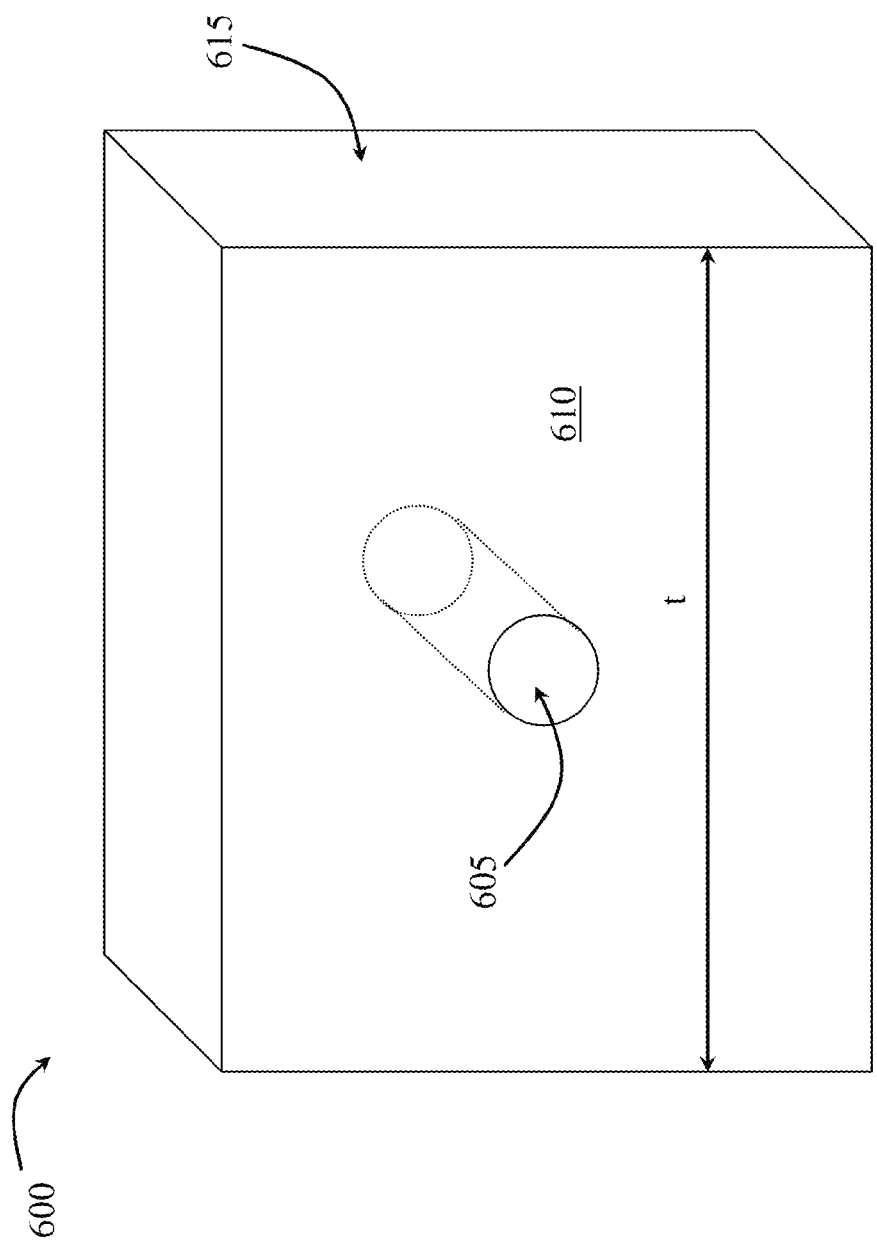
FIG. 6 shows a polycrystalline diamond cutting element according to other embodiments of the present disclosure.

Referring to FIG. 6, a cutting element 600 according to embodiments of the present disclosure may have an acid infusion pathway 605 formed through the PCD body 610 and subjected to a leaching process to form thermally stable polycrystalline diamond. As shown, the cutting element 600 has a PCD body 610, wherein the PCD body 610 has a cutting face 615 and extends a thickness t from the cutting face 610. The PCD body 610 has a cavity forming an acid infusion pathway 605 extending through the PCD body 610 along the shortest dimension of the PCD body. However, according to other embodiments of the present disclosure, an acid infusion pathway may extend partially through the PCD body. One or more acid infusion pathways may be formed in a PCD body of the present disclosure. Further, one or more acid infusion pathways may be formed in a PCD body along the shortest dimension of the PCD body and/or along other dimensional directions.

PCD cutting elements according to the present disclosure may be fixed cutters or rolling cutters, and may be used on downhole cutting tools, such as drill bits, reaming tools, fishing tools, and milling tools. For example, PCD cutting elements of the present disclosure may be rolling cutters, such as those described in Examples of rolling cutters that may be used in the present disclosure may be found at least in U.S. Pat. No. 7,703,559, U.S. Patent Publication No. 2011/0297454, and U.S. Patent Application Nos. 61/351,035, 61/479,151, 61/479,183, 61/566,875, 61/566,859, 61/561,016, 61/559,423, which are assigned to the present assignee and hereby incorporated by reference in their entirety, wherein the PCD cutting elements are rotatably mounted to a cutter pocket of a downhole drilling tool. In other embodiments, a PCD cutting element of the present disclosure may be fixed to a downhole cutting tool, such as in a cutter pocket formed in a blade of a drag bit, by brazing through an intermediary sleeve material or by mechanical attachment. In embodiments having a PCD cutting element attached to a cutting tool by brazing, the PCD cutting element may be brazed within a cutter pocket by vacuum or induction brazing, for example. During a brazing process, a braze alloy, such as a material selected from silver, copper, zinc, tin, boron, gallium, indium, and thallium, or other braze alloys known in the art, may be placed in the cutter pocket between the surfaces of the cutter pocket and the PCD cutting element, either before or after the PCD cutting element is positioned in the cutter pocket. Heat is applied to the braze alloy to melt the braze alloy, and as the braze alloy cools, a bond is formed between the PCD cutting element and the cutter pocket. According to some embodiments, use of boron in the braze alloy may be preferred due to its enhanced ability to bond to diamond.

PCD cutters of the present disclosure may be secured to a downhole cutting tool such that the cutting face of the PCD cutter faces in the direction of rotation of the downhole cutting tool. Thus, as the cutting tool rotates, the cutting face of the PCD cutter contacts and scrapes the earthen formation being cut. Due to this shearing-type engagement with the earthen formation, such cutters are often referred to as shear cutters. According to embodiments of the present disclosure, a PCD cutter of the present disclosure may be placed in a cutter pocket formed in a cutting tool and secured thereto. In embodiments having the PCD cutter rotatably secured in the cutter pocket (wherein the PCD cutter is a rolling cutter), the PCD cutter may be secured to the cutting tool mechanically, such as described in U.S. Publication No. 2007/0278017. In embodiments having the PCD cutter fixedly secured in the cutter pocket, the PCD cutter may be attached to the cutting tool by brazing and/or by mechanical attachment. The PCD cutter, whether fixed to or rotatably secured to the cutting tool, may be positioned in a cutter pocket so that the cutting face of the PCD cutter faces in the direction of rotation of the cutting tool and wherein the thickness of the PCD cutter extends from the cutting face a distance within the cutter pocket.

For example, according to embodiments of the present disclosure, a downhole cutting tool, such as a drill bit, may have a body and a rotational axis extending there through. A plurality of cutter pockets may be formed in the drill bit, and any of the PCD cutters of the present disclosure placed therein. As discussed above, PCD cutters according to embodiments of the present disclosure may be made of a PCD body having a cutting face, a thickness extending from the cutting face, and a cutting face area to thickness ratio ranging from 60:16 to 400:8. A PCD cutter of the present disclosure may be positioned within one of the cutter pockets of the cutting tool such that the cutting face of the PCD cutter faces in the direction of rotation of the cutting tool and wherein the thickness of the PCD cutter extends from the cutting face a distance within the cutter pocket.

Referring now to FIGS. 11A-C, a cross-sectional view of a cutter assembly having a rotatable cutting element 2020, according to an embodiment of the invention. According to an embodiment, a rotatable cutting element may be retained in a cutter pocket. For example, a segment of a bit blade 2000 has a rotatable cutting element 2020 assembled within a cutter pocket 2010. Particularly, the rotatable cutting element 2020 has a cutting face 2022, an outer circumferential surface 2024, and a circumferential channel 2026 formed within the outer circumferential surface 2024. The cutter pocket 2010 has a back surface 2012 and a side surface 2014, wherein a receptacle 2015 (represented by the shaded area) is formed within the side surface 2014 to receive a partial sleeve 2040. The receptacle 2015 extends from the leading side 2002 of the blade 2000 a distance D along the length of the cutter pocket 2010 and a radial distance around the side surface of the cutter pocket 2010. A partial sleeve 2040 may be positioned adjacent to the rotatable cutting element 2020, such that the partial sleeve 2040 extends partially around the outer circumferential surface 2024 of the rotatable cutting element 2020. Further, the partial sleeve 2040 may have a lip 2046 formed thereon that mates with the circumferential channel 2026 of the rotatable cutting element 2020. The rotatable cutting element 2020 and the partial sleeve 2040 may then be inserted into the cutter pocket 2010. The partial sleeve 2040 may be attached to the cutter pocket 2010 to form part of the cutter pocket side surface, wherein the rotatable cutting element 2020 may rotate within the cutter pocket 2010 and partial sleeve 2040. Methods of attaching the partial sleeve 2040 to the cutter pocket 2010 may include, for example, brazing, welding, mechanical locking, or other means known in the art.

As shown, the partial sleeve 2040 and the cutter pocket side surface 2014 may form an arc A. The arc may extend around the rotatable cutting element 2020 greater than 180 degrees. In some embodiments having an arc extending greater than 180 degrees, a rotatable cutting element may be retained within a cutter pocket using only the side wall of the cutter pocket. For example, a side wall retention mechanism (the mating lip formed along the cutter pocket side wall and circumferential channel formed within the rotatable cutting element) may retain the rotatable cutting element axially within the cutter pocket, while the extension of the cutter pocket side wall greater than 180 degrees may inhibit the rotatable cutting element from being dislodged (pulled out from the top face) from the cutter pocket.

Any of the PCD cutting elements described herein may be installed on a bit to shear an earthen formation. For example, in some embodiments, a PCD cutting element according to the present disclosure may have a channel formed therein (described above). In such embodiments, the PCD cutting element may be positioned within a cutter pocket formed on a bit and at least partially retained to the bit using the channel. For example, a mechanical retention mechanism may be at least partially inserted into the channel and either attached to the bit or formed integrally with the bit to retain the PCD cutting element within the cutter pocket. The PCD cutting element may be retained to the bit using various mechanical retention mechanisms, such that the cutting face of the PCD cutting element faces in the direction or rotation of the bit.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A cutting element comprising a polycrystalline diamond body, wherein the polycrystalline diamond body comprises:
   a cutting face;
   a thickness of the polycrystalline body extending from the cutting face; and
   a cutting face area to thickness ratio ranging from 60:16 to 500:5;
   wherein the thickness of the polycrystalline body is greater than or equal to 8 mm and less than or equal to 16 mm.

2. The cutting element of claim 1, wherein the cutting face has a diameter greater than or equal to 8 mm.

3. The cutting element of claim 1, further comprising a substrate.

4. The cutting element of claim 3, wherein the substrate comprises a first region adjacent to the diamond body and at least one additional region adjacent to the first region opposite from the diamond body, wherein the first region comprises hard particles having a smaller median grain size than hard particles of the at least one additional region.

5. The cutting element of claim 3, wherein the substrate comprises a first region adjacent to the diamond body and a second region, wherein the first region comprises carbide particles ranging in size from about 2 microns to 3 microns, and wherein the second region ranges in size from about 4 microns to about 6 microns.

6. The cutting element of claim 1, wherein the diamond body comprises thermally stable polycrystalline diamond.

7. The cutting element of claim 1, wherein at least one acid infusion pathway is formed in the diamond body.

8. The cutting element of claim 1, wherein the polycrystalline diamond body comprises boron additive.

9. The cutting element of claim 1, wherein the polycrystalline diamond body has a bulk thermal conductivity of greater than 200 W/mK.

10. The cutting element of claim 1, wherein the polycrystalline diamond body comprises a plurality of bonded together diamond grains and a carbonate solvent catalyst.

11. The cutting element of claim 1, wherein the polycrystalline diamond body comprises a diamond gradient.

12. A drill bit, comprising:
   a bit body having a rotational axis extending therethrough;
   at least one cutter pocket formed in the drill bit; and
   at least one cutting element positioned in the at least one cutter pocket, wherein the at least one cutting element comprises a polycrystalline diamond body, and wherein the polycrystalline diamond body comprises:
   a cutting face;
   a thickness of the polycrystalline diamond body extending from the cutting face to a distance within the cutter pocket; and
   a cutting face area to thickness ratio ranging from 60:16 to 500:5;
   wherein the thickness of the polycrystalline diamond body is greater than or equal to 8 mm and less than or equal to 16 mm; and
   wherein the at least one cutting element is positioned in the at least one cutter pocket such that the cutting face faces in the direction of rotation of the drill bit.

13. The drill bit of claim 12, wherein the at least one cutting element is fixed within the at least one cutter pocket.

14. The cutting element of claim 12, wherein the at least one cutting element is rotatably mounted to the at least one cutter pocket.

15. A drill bit, comprising:
   a bit body having a rotational axis extending therethrough;
   at least one cutter pocket formed in the drill bit; and
   at least one cutting element positioned in the at least one cutter pocket, wherein the at least one cutting element comprises a polycrystalline diamond body having a thickness greater than or equal to 8 mm and less than or equal to 16 mm and has a bulk thermal conductivity of greater than 100 W/mK;
   wherein the at least one cutting element is positioned in the at least one cutter pocket such that the cutting face faces in the direction of rotation of the drill bit.

16. The drill bit of claim 15, wherein the polycrystalline diamond body has a bulk thermal conductivity of greater than 200 W/mK.

17. The drill bit of claim 15, wherein the at least one cutting element is fixed within the at least one cutter pocket.

18. The drill bit of claim 15, wherein the at least one cutting element is rotatably mounted to the at least one cutter pocket.

* * * * *